Dec. 15, 1964 C. H. SCHULMAN 3,161,829

DEVICE FOR PREVENTING TRANSMISSION OF PULSE POSITION MODULATED ENERGY IN ABSENCE OF MODULATOR INPUT

Filed Sept. 5, 1961 2 Sheets-Sheet 1

INVENTOR.
CHARLES H. SCHULMAN
BY Julian C. Renfro
ATTOR.

INVENTOR.
CHARLES H. SCHULMAN
BY
Julian C. Renfro
ATTOR.

United States Patent Office 3,161,829 Patented Dec. 15, 1964

3,161,829

DEVICE FOR PREVENTING TRANSMISSION OF PULSE POSITION MODULATED ENERGY IN ABSENCE OF MODULATOR INPUT

Charles H. Schulman, Orlando, Fla., assignor to Martin-Marietta Corporation, a corporation of Maryland Filed Sept. 5, 1961, Ser. No. 136,075
15 Claims. (Cl. 325—152)

Figure 1:
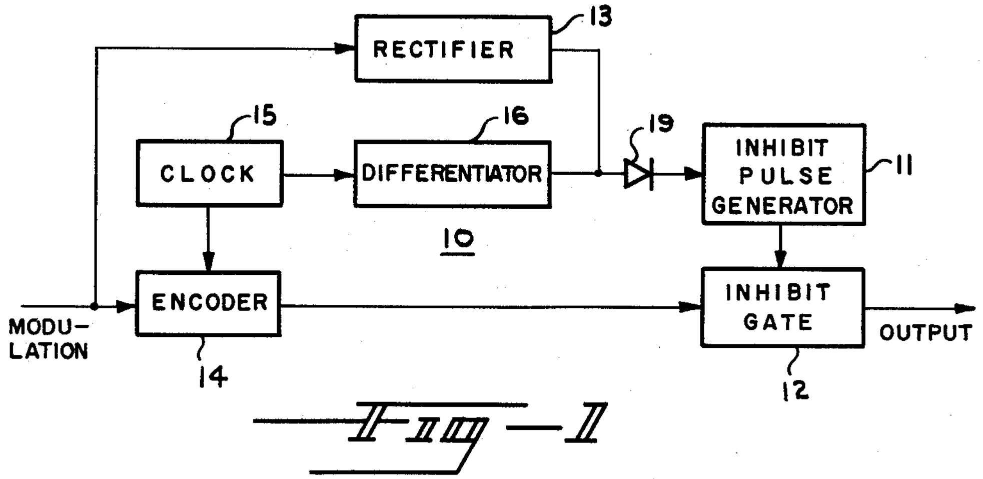

My invention relates to a modulation operated switch and more particularly to a switch for pulse position modulation systems, such as those used for voice and data transmission, for preventing transmission of energy in the absence of modulation.

In the past, various signal transmitting arrangements have been proposed for removing the carrier from the air in the absence of any modulation, but in each known instance this type of scheme has been limited to devices employing mechanical relays which of course are slow to operate. Other devices of this type remove the carrier in the air in the absence of a change in modulation, but such devices are quite limited in their function.

According to the present invention I have provided a modulation-operated switch that is entirely electrical in nature and that very advantageously serves to automatically remove the carrier from the transmission medium in the absence of modulation. This is accomplished by the use of a minimum of circuitry and may advantageously be incorporated into a communication system of the type described in the copending application of McKay Goode entitled "Discrete Address Communication System With Random Access Capabilities," Serial No. 107,194, and assigned to the assignee of the present invention.

According to my invention, a modulation-operated switch can utilize a gate for receiving inhibit pulses and keying pulses, means for supplying inhibit pulses to said gate in fixed relation to a time frame, and means for supplying keying pulses to said gate. The keying pulses are in coincidence with the inhibit pulses when the keying pulses contain no modulation, with the gate being arranged to prevent passage of keying pulses upon their coincidence in time with inhibit pulses.

However, pulses containing position modulated information will pass through said gate by virtue of their time change of position with respect to said inhibit pulses.

An inhibit pulse generator can be utilized for normally supplying inhibit pulses to said gate, but the inhibit pulse generator can automatically be rendered inoperative in the presence of modulation so that desirably no inhibit pulses will be generated.

The inhibit pulse generator typically is designed to be used with the transmitter of the modulation system and advantageously may be interconnected with certain basic components of the transmitter so as to always be in proper synchronism therewith. More particularly, the clock used in conjunction with the encoder of a position modulation system to generate the time frames may be employed to trigger the inhibit pulse generator for the generation of inhibit pulses. Inhibit pulses never move with respect to the time frame, although their removal under certain circumstances prevents distortion of the modulation signal.

Upon the application of modulation to the encoder of the device with which my switch is used, the transmitter keying pulse is moved in time with respect to the clock and hence with respect to the inhibit pulse. The transmitter keying pulse upon moving out of coincidence with the inhibit pulse is free to key the transmitter and place the carrier in the transmission medium. It should be noted that the carrier is placed upon the transmission medium almost instantaneously, and no time is required for the building up of an activating voltage as some prior art systems have required.

During the normal course of modulation with some types of modulation, the transmitter keying pulse will move back and forth through the inhibit pulse. As it does so, those keying pulses which coincide with the inhibit pulse will be lost and will not key the transmitter. This puts distortion into the modulation pattern at the receiver and for some applications such as audio may be undesirable. Accordingly, my invention also comprehends the use of a rectifier which serves to rectify the modulation which is simultaneously being applied to the encoder. The output of this rectifier serves to prevent the inhibit pulse generator from generating the inhibit pulse, thus allowing the modulated transmitter keying pulse to move back and forth in its time frame without loss of pulses. The net result is to almost instantaneously begin transmission of information at the expense of a few lost pulses at the beginning of the transmission, but this causes no noticeable distortion. Upon the cessation of the modulation, the output of the rectifier goes to zero, allowing the inhibit pulse generator to function again to generate inhibit pulses which will now coincide with the unmodulated transmitter keying pulses, thus preventing latter pulses from keying the transmitter.

Figure 2:
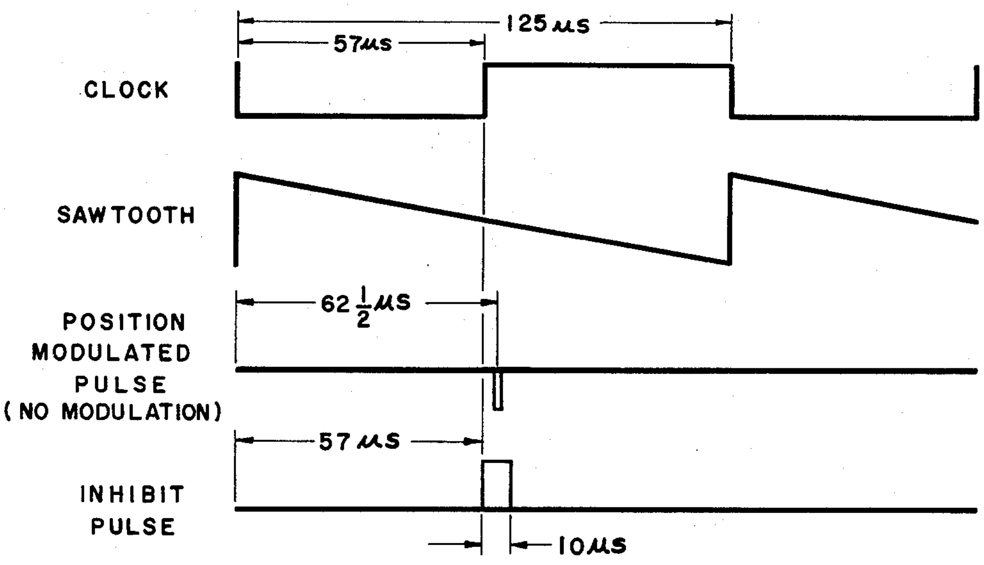
Figure 3:
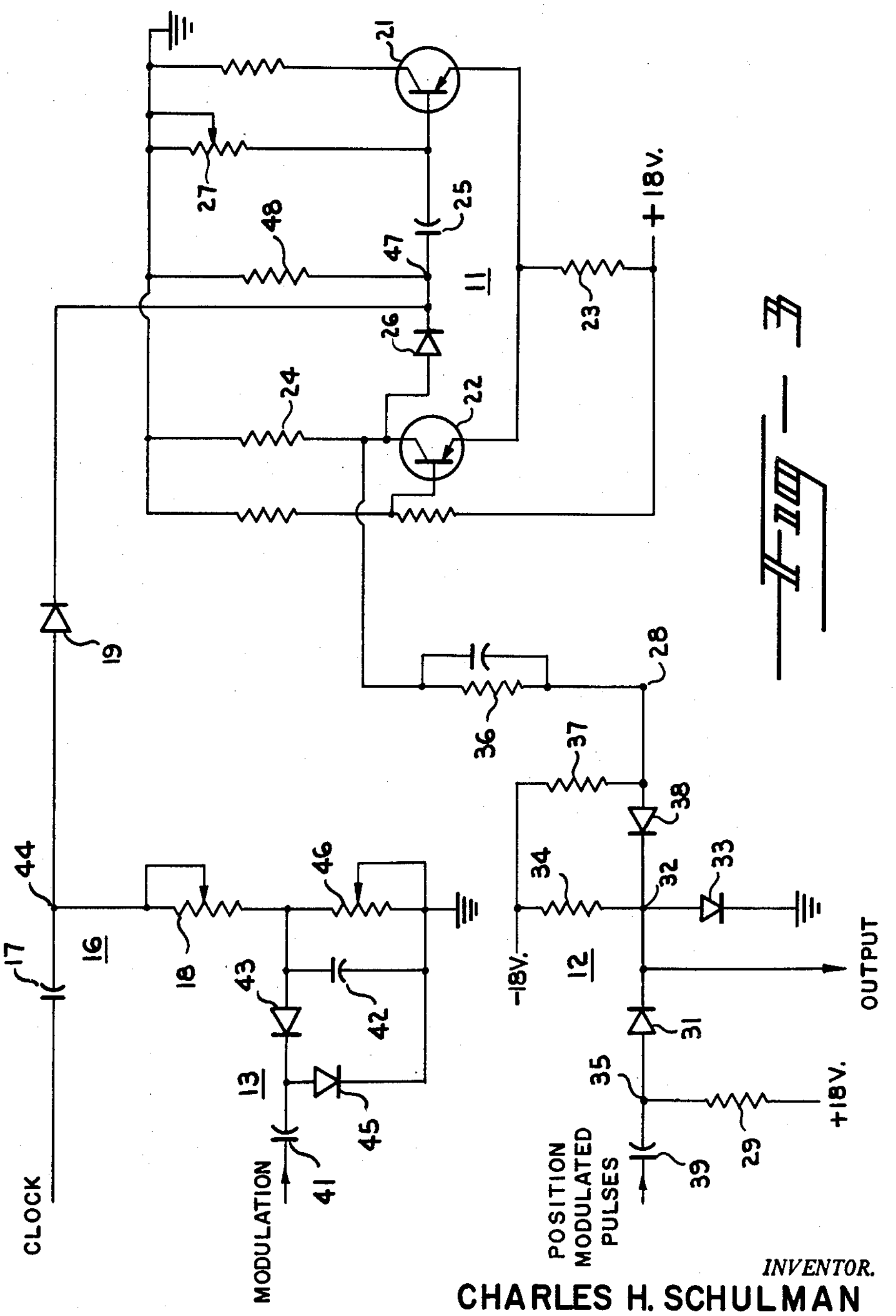

These and other objects, features and advantages of this invention will be apparent from an inspection of the drawings in which:

FIGURE 1 illustrates a block diagram of a modulation-operated switch according to my invention as incorporated into a portion of a pulse position modulator;

FIGURE 2 is a timing diagram illustrating the interrelationships of the pulses of the clock, a sawtooth generated in the encoder in synchronism with the clock, the unmodulated position of the position modulated pulse, and the inhibit pulse generated by the forward edge of the clock square wave; and FIGURE 3 is a circuit diagram of the inhibit pulse generator, the inhibit gate and the rectifier utilized in accordance with my invention.

A modulation-operated switch 10 according to my invention principally comprises an inhibit pulse generator 11 and an inhibit gate 12 operated by generator 11. As seen in FIGURE 1, the gate 12 is disposed in such a position that it can prevent the transmission of position modulated pulses from encoder 14 to the output, so by arranging the inhibit pulse generator 11 to operate the gate 12 so as to allow pulses to pass only when modulation is present, the transmitter may, for example, desirably have no output during the pauses in normal speech.

As set forth in detail in the previously referenced application of McKay Goode, Ser. No. 107,194, the encoder 14 may comprise a sawtooth generator, an adder, a Schmitt trigger and a differentiator, the output from the encoder being connected to a voice operated switch, with the output passing through the switch in event of an input audio signal. The sawtooth generator (not shown) provides a linear sawtooth, with the time of the generator being controlled by a clock, which would be clock 15 according to the present description. For audio, the clock should be arranged to furnish pulses at a repetition rate of 2½ to 3 times the highest audio frequency to be produced, and for convenience this frequency may be set at 8000 pulses per second. The clock square wave may be generated by means of a sine wave oscillator, which triggers a Schmitt trigger, latter device being used because its output is a square wave whose beginning and end may be accurately determined. This Schmitt trigger is separate and distinct from the Schmitt trigger used in the encoder.

The pulses from the clock cause the sawtooth generator of the encoder to operate an electron discharge circuit, the output of which is a sawtooth waveform. The output from an audi amplifier is added to the sawtooth in a resistive adder and the sum of these signals is applied to the aforementioned Schmitt trigger of the encoder so that the output stage of the Schmitt trigger is made to conduct as the sawtooth passes through its midpoint in the absence of modulation, or at some other point if modulation is present, this point being determined by the amplitude of the modulation. During the retrace portion of the sawtooth, the output stage is returned to its nonconducting state and the cycle is repeated. This results in an output from the Schmitt trigger which is pulse-width modulated. The beginning of each pulse is coincident with the retrace time of the sawtooth and the width of each pulse is proportional to the amplitude of the audio signal at the particular time of the end of the pulse. As will be apparent, in the unmodulated case, the end of the width modulated pulse will occur at a fixed position with respect to the pulses from the clock. The operation of converting pulse width modulated pulses to pulse position modulated pulses is accomplished in the differentiator (not shown) of the encoder, which produces a narrow output pulse corresponding in time to the end of each pulse width modulated pulse, with those pulses which would correspond to the time of the sawtooth retraces being discarded. Thus in the unmodulated case, the position modulated pulses always occur at a fixed distance from the clock pulses, such as at 62½ microseconds as shown in FIGURE 2. This distance is determined by the triggering level of the Schmitt trigger of the encoder 14. The foregoing details of the encoder are presented by way of background, and form no part of the present invention. Chapter 17 of "Modulation Theory," by H. S. Black (D. Van Nostrand, 1953) sets forth a family of pulse position modulation devices with which the present modulation-operated switch may be made to operate.

As will be seen in more detail hereinafter, the inhibit pulse generator 11 may for example basically be a monostable multivibrator operative in the absence of modulation to produce a series of timed output pulses to gate 12 to prevent, by their coincidence in time with position modulated pulses, the passage of latter pulses through the gate to the output stage of the transmitter, not shown. As will be noted in FIGURE 3, the gate 12 preferably operates from a dual voltage source, which may be −18 volts and +18 volts, although this is not a critical design characteristic of this invention. Additionally, I prefer to connect inhibit pulse generator 11 between +18 volts and ground, rather than the more conventional configuration of grounding the emitter resistor and connecting the collector and base resistors to −18 volts. My preferred arrangement is used as a matter of convenience in connecting the output of rectifier 13 to the inhibit pulse generator 11 inasmuch as it is necessary that the two sides of diode 19, in the absence of modulation, be at the same potential. The latter is true because the differentiated pulses from the clock must pass through diode 19 in order to trigger the inhibit pulse generator. Since junction 44 in the absence of modulation is at ground potential, it is necessary that junction 47 also be at ground potential. The same potential for these two junctions 44 and 47 is achieved by the used of the +18 volts and ground arrangement depicted. Latter arrangement also allows for direct coupling of the inhibit pulse generator 11 to the gate 12.

As revealed in the timing diagram shown in FIGURE 2, the output from clock 15 may be a square wave, one edge of which may be used to trigger the sawtooth generator of encoder 14, and the other edge used to trigger the inhibit pulse generator 11 according to this invention. As seen in latter figure, the positive going portions of the sawtooth wave coincide with the negative going portions of the clock square wave, and the leading edge of the inhibit pulses coincide with the positive going portions of the clock square wave. Thus the clock causes the sawtooth generator and the inhibit pulse generator to run in synchronism, as is required.

Differentiator 16 comprises an RC network formed by capacitor 17 and variable resistance 18, and this network functions to convert the square wave from the clock to a pulse which serves to trigger inhibit pulse generator 11 at the time when the clock square wave is positive going. This square wave has previously been arranged to have the proper symmetry, so that the positive going portion will occur before the middle of the time frame and so that the inhibit pulse will be generated prior to the generation of the transmitter keying pulse, thus allowing an unmodulated transmitter keying pulse to occur timewise approximately in the middle of the inhibit pulse. For example, the sampling period may be 125 microseconds long, with the comparatively wide inhibit pulse commencing, along with the positive-going portion of the clock waveform, about 57 microseconds from the beginning of the time frame, with the middle of the one-microsecond encoder pulse occurring about 62.5 microseconds from the beginning. The length of the inhibit pulse may for example be 10 microseconds, with potentiometer 27 being effective to adjust the length of this pulse.

The clock symmetry can be adjusted by means of a potentiometer (not shown) arranged to vary the bias on the aforementioned Schmitt trigger (not shown) used in the clock. By thus positioning the positive going portion of the clock square wave, the inhibit pulse can be placed so that the unmodulated encoder pulse will occur in time in the desired position, usually the middle, of the inhibit pulse.

Diode 19 is provided between differentiator 16 and generator 11 to prevent the transmission of the negative portion of the differentiated clock pulse to the inhibit pulse generator, and in the event a rectified 13 is used for the purpose hereinafter described, this diode additionally has an even more important function. Diode 19 may be of type 1N658.

The inhibit pulse generator 11 preferably uses transistors 21 and 22, although a vacuum tube configuration may be used if preferred. Transistors 21 and 22 may be PNP transistors of the 2N501 type. Transistor 21 is normally conducting because its base is connected to ground through variable resistor 27.

Upon the application of a differentiated clock pulse to the base of transistor 21, it ceases conducting, and upon the cessation of current flow through transistor 21, the voltage decreases across the resistor 23, bringing about a reduction in bias on transistor 22, causing it to go into conduction. When transistor 22 conducts, current flows through resistor 24 causing the collector of transistor 22 to go positive. The collector will stay in this positive condition for such time required for the capacitor 25 to change its charge sufficiently to allow transistor 21 to come back into conduction. This time required is determined by capacitor 25 and potentiometer 27. When transistor 21 comes back into conduction, additional current is drawn through resistor 23 from the +18 volt power source, and this additional current increases the voltage on the emitters of both transistors which serve to increase the bias on transistor 22, taking it out of conduction. At this time, the collector of transistor 22 assumes its original quiescent condition because current is no longer drawn through resistor 24. Thus, the output on the collector of transistor 22 assumes the form of a positive pulse whose duration is determined by the RC combination previously mentioned. Therefore, positive pulses in synchronism with the clock are delivered to junction 28 which serves to inhibit the unmodulated transmitter keying pulses that otherwise would flow were it not for the action of gate 12. Ordinarily, the voltage on the collector of transistor 22 will not return to its quiescent value immediately because capacitor 25 has to be recharged through resistor 24, and instead of the desired rectangular pulse, as shown in FIGURE 2, a pulse whose trailing edge decays slowly would be obtained. To prevent this, diode 26 and resistor 48 are used. Immediately before the inhibit pulse generator returns to its quiescent state, the collector of transistor 22 and the junction 47 are approximately at the same potential, which is some positive value. Upon returning to its quiescent state, the collector of transistor 22 goes to zero immediately, back-biasing diode 26, since junction 47 remains at about its same positive value until capacitor 25 is recharged. Capacitor 25 is now recharged through resistor 48 and the desired pulse is obtained at the collector of transistor 22.

As previously mentioned, the gate 12 serves to inhibit the transmitter keying pulse when it coincides in time with the inhibit pulse generated by the inhibit pulse generator 11. As to the operation of gate 12, when no pulses of either type are applied to the gate, current flows from the +18 volt voltage source through resistor 29 and diode 31, the current dividing at junction 32, with part of the current flowing through diode 33 to the ground and the remainder through resistor 34 to the negative voltage source. The voltage at junction 32 is approximately zero, differing from that value only by the forward voltage drop across the diode 33, or about one-half volt. Likewise the voltage at junction 35 is approximately zero, differing from it by the forward voltage drops across diodes 33 and 31. This voltage drop is typically about 1 volt. The voltage at junction 28 is at some negative value in this condition, determined by the voltage divider made up of resistors 24, 36, and 37. Since it was initially assumed that there were no input pulses to the inhibit gate, transistor 22 is not in a conducting state and therefore does not affect the operation of the voltage divider formed by resistors 24, 36 and 37. Inasmuch as junction 28 is negative and junction 32 is at ground, diode 38 is back-biased, which is a desirable condition when position-modulated pulses enter the gate.

Applying a negative transmitter keying pulse to the gate through capacitor 39 causes junction 35 to go negative by the value of this negative pulse, and because diode 31 is conducting by virtue of the positive voltage applied to the positive side of the diode and the negative voltage applied to the negative side of the diode, junction 32 goes negative by the amount of incoming pulse. This means that an output will be obtained through gate 12 because the output is at the same level as junction 32. Diode 38 has no effect, so long as the output pulse amplitude does not exceed the value of the quiescent voltage at junction 28.

The operation of the gate 12 should now be considered in the instance in which an inhibit pulse generated by the inhibit pulse generator 11 appears at junction 28 prior to the application of the transmitter keying pulse. It should be noted that the inhibit pulse, when such is generated, arrives at the gate before the transmitter keying pulse arrives at the gate by virtue of the arrangement of the symmetry of the clock square wave, as previously discussed. Junction 28 now changes from a negative potential to some positive potential because of the application of the positive inhibit pulse. This causes diode 38 to conduct, which draws additional current through diode 33, the current through this diode flowing from diodes 31 and 38. The potential at junction 32 remains approximately zero. Now upon the application of a transmitter keying pulse, which occurs coincidentally with the inhibit pulse, junction 35 goes negative as before, but junction 32, because it is now clamped to zero by the current flowing through diode 33, which is conducting as a result of the current supplied by the inhibit pulse, cannot follow the transmitter keying pulse. Thus no output is obtained from the gate and the only effect of the transmitter keying pulse is to backbias diode 31. No output will now take place through the inhibit gate and the transmitter will not be keyed, thus keeping RF energy out of the transmission medium when the transmitter keying pulse and inhibit pulse coincide in time. Diodes 31, 33 and 38 may be of type 1N658.

Upon the application of position modulated transmitter keying pulses to the gate, coincidence with the inhibit pulses will no longer occur, for the position modulated pulses will move timewise with respect to the fixed inhibit pulses. The transmitter keying pulses therefore are now free to move through the gate output to the transmitter.

However, in the normal course of modulation some of the position modulated transmitter keying pulses may coincide with the inhibit pulses. This may cause an objectionable loss of transmitter keying pulses, which in turn may cause distortion at the receiver. In order to prevent this, it may become desirable to prevent the generation of the inhibit pulses. This is accomplished according to this invention by the use of rectifier 13 and diode 19.

Rectifier 13 is preferably of the half-wave voltage-doubler type as shown and is designed to develop a D.C. voltage opposite in sign to that of the inhibit pulse generator triggering signal so as to deactivate the inhibit gate during the modulation period. A waveform, which is actually the modulation and which may be generally sinusoidal in nature, as in the case of audio, is applied through capacitor 41. During the positive portion of the waveform, capacitor 41 charges through diode 45 to the peak value of the waveform. During the negative portion of the waveform, the voltage across capacitor 41 is placed in series with the source (modulation) voltage so that capacitor 42 is charged through diode 43 to a D.C. voltage equal to the peak-to-peak value of the waveform. This D.C. voltage is applied to diode 19 through potentiometer 18 and serves to backbias diode 19. Thus, in the presence of an input to the rectifier 13, diode 19 is back-biased and the differentiated clock pulses which appear at junction 44 are not permitted to pass to trigger the inhibit pulse generator 11. Without these differentiated clock pulses, the inhibit pulse generator 11 is no longer triggered and no inhibit pulses are applied to gate 12. Thus all transmitter keying pulses regardless of their position in time are applied to the transmitter. Diodes 43 and 45 are preferably of type 1N277 of germanium, which conduct at comparatively low voltage, thus allowing rectifier 13 to operate at lower modulation levels than would be permitted by the use of silicon types.

Upon the cessation of modulation, the negative D.C. voltage which has been stored in capacitor 42 is allowed to discharge from the capacitor through variable resistor 46 to ground. This removal of charge from capacitor 42 in turn decreases the voltage at junction 44, which allows the differentiated clock pulses to pass through diode 19, again generating the inhibit pulses. Because the moldulation has ceased the transmitter keying pulses are once again in coincidence with the inhibit pulse and are inhibited by the gate. It will be seen that by setting resistor 46 appropriately, the length of the pause in modulation required to reactivate the inhibit pulse generator may be adjusted for optimum operation.

Potentiometer 18 may be adjusted to determine the amplitude of the differentiated clock pulse, thereby determining at what level of the D.C. voltage (hence what level of modulation) the diode will be sufficiently back-biased to prevent triggering the inhibit pulse generator. In other words, potentiometer 18 determines at what level of modulation the inhibit pulses will no longer be generated. Generally the adjustments will be such that when the modulation is of sufficient amplitude to move the position modulated pulses out of coincidence with the inhibit pulses, the D.C. voltage derived from the modulation by rectifier 13 will be just sufficient to back-bias diode 19. It should be noted that for data transmission purposes, a rectifier arrangement is not necessary.

The amount of modulation necessary to activate the switch 10 is a function of the width of the inhibit pulse (which is adjusted by means of potentiometer 27) and the amplitude of the differentiated clock pulse as determined by potentiometer 18. For audio uses in low-level noise areas, the amount of modulation required for activation would be small (narrow inhibit pulse, small differentiated clock pulse), whereas in high-level noise areas, the amount of modulation required for activation will be large, requiring wide inhibit pulses and large differentiated clock pulses.

As should now be apparent, my modulation-operated switch is admirably suited for preventing the transmission of unmodulated position modulated pulses, but nevertheless enabling the almost instantaneous activation of a transmitter with which my invention is used, upon the application of voice or data modulation to the transmitter.

My invention is capable of being put to a wide range of uses, and I am not to be limited to the embodiments described herein, except as required by the scope of the appended claims.

I claim:

1. A modulated-operated switch for preventing the passage of unmodulated pulses from pulse position modulation equipment, said switch comprising a gate having two inputs and an output, one of said inputs receiving a stream of position modulated pulses, said pulses when carrying information being disposed in a variable position with respect to a zero reference position, thus reflecting the degree of modulation present, inhibit pulse generating means connected to the other of said inputs and arranged to supply inhibit pulses to said gate that are synchronized to occur at the time of any pulses in the zero reference position, said inhibit pulses being at least as wide as the pulses of said stream, said gate having no output when a pulse of said stream is in the zero reference position by virtue of its coincidence with an inhibit pulse, said gate passing modulated pulses by virtue of the lack of coincidence thereof with an inhibit pulse.

2. The modulation-operated switch as defined in claim 1 in which means are provided for preventing the generation of inhibit pulses by said inhibit pulse generating means in the presence of position modulated pulses.

3. A modulation- operated switch for use with a pulse position modulated transmitter, said switch comprising a gate for receiving a stream of position modulated pulses, an inhibit pulse generator connected to said gate for controlling the operation of said gate, said generator normally generating inhibit pulses in coincidence with unmodulated pulses, timing means for assuring the coincidence of said inhibit pulses with unmodulated pulses of said stream, said inhibit pulses preventing the passage of unmodulated pulses through said gate, said gate allowing the passage of modulated pulses by virtue of their time change of position with respect to said inhibit pulses.

4. A modulation-operated switch for use with a pulse position modulated transmitter, said switch comprising a gate for receiving position modulated transmitter keying pulses, an inhibit pulse generator connected to said gate for controlling the operation of said gate, said generator normally generating inhibit pulses in coincidence with unmodulated transmitter keying pulses, said inhibit pulses preventing the passage of transmitter keying pulses through said gate in the event latter pulses are unmodulated, said gate allowing the passage of modulated transmitter keying pulses by virtue of their time change of position with respect to said inhibit pulses, and means for rendering said generator inoperative in the presence of modulation, whereby no inhibit pulses will be generated.

5. A modulation-operated switch for use with a pulse position modulated transmitter, said switch comprising gating means for receiving position modulated transmitter keying pulses, inhibit pulse generator means for generating inhibit pulses for controlling the operation of said gating means, timing means for assuring the coincidence of inhibit pulses with unmodulated transmitter keying pulses, said gating means preventing the passage of keying pulses through said gate in the event the transmitter keying pulses are unmodulated and coincide with said inhibit pulses, and means for rendering said generating means inoperative in the presence of modulation, whereby said gating means will then pass all transmitter keying pulses.

6. A modulation-operated switch for use with a pulse position modulated transmitter, said switch comprising gating means for receiving position modulated transmitter keying pulses, inhibit pulse generator means for controlling the operation of said gating means, said generator means normally generating inhibit pulses in coincidence with unmodulated transmitter keying pulses, and causing said gating means to prevent the passage of keying pulses therethrough in the event the transmitter keying pulses are unmodulated, and means for rendering said generating means inoperative in the presence of modulation, whereby said gating means will then pass all transmitter keying pulses, said gating means including a diode that will normally pass a position modulated pulse, means for back-biasing said diode in the presence of an inhibit pulse, whereby in the event of coincidence of said inhibit pulse and said position modulated pulse, latter pulse will not be passed.

7. A modulation-operated switch for use with position modulated keying pulse generating means of a transmitter, said switch comprising a gate for controlling the keying pulse input to said transmitter, said gate receiving position modulated keying pulses from said pulse generating means, the position of sadi keying pulses in time being dependent upon their modulation, an inhibit pulse generator for controlling the operation of said gate by generating inhibit pulses, and timing means for assuring the generation of inhibit pulses by said generator in synchronism with keying pulses containing no modulation, said inhibit pulses preventing the transmission of unmodulated keying pulses through said gate in the event of coincidence with said latter pulses, said gate passing transmitter keying pulses containing position modulation information by virtue of their lack of coincidence with said inhibit pulses.

8. A modulation-operated switch for use with a pulse position modulation encoder for generating keying pulses for a transmitter, said switch comprising a gate disposed in operative relation with said encoder for blocking keying pulses from said encoder if said pulses contain no modulation, an inhibit pulse generator operative in timed relation with said encoder for supplying inhibit pulses to said gate, to control the operation of same, timing means for assuring that the inhibit pulses supplied to said gate by said generator are in coincidence with unmodulated keying pulses to said gate from said encoder, the reception of a modulating signal by said encoder shifting in time the keying pulses developed therein, the time displacement of the modulated keying pulses taking same out of coincidence with inhibit pulses applied to said gate circuit, allowing such modulated keying pulses to pass through said gate.

9. A modulation-operated switch for use with a pulse position modulation encoder for generating keying pulses for a transmitter, said switch comprising a gate disposed in operative relation with said encoder for blocking keying pulses from said encoder if said pulses contain no modulation, an inhibit pulse generator operative in timed relation with said encoder for supplying inhibit pulses to said gate, to control the operation of same, the inhibit pulses supplied to said gate by said generator being in coincidence with unmodulated keying pulses to said gate from said encoder, the reception of a modulating signal by said encoder shifting in time the keying pulses developed therein, the time displacement of the modulated keying pulses taking same out of coincidence with inhibit pulses applied to said gate circuit, allowing such modulated keying pulses to pass through said gate, and circuit means actuated by the modulating signal for developing a signal opposite in sign to that of the triggering signal of said inhibit pulse generator, so as to deactivate said inhibit gate shortly after the commencement of the modulating period.

10. A modulation-operated switch for use with a pulse position modulated transmitter encoder for removing energy from the transmission medium in the absence of modulation, said switch comprising a gate for controlling the flow of pulses from the encoder, an inhibit pulse generator for generating gate-controlling pulses, fixed in time, for controlling the operation of said gate, means for causing said generator to generate the gate-controlling pulses in coincidence with unmodulated pulses emanating from said encoder, said gate blocking the flow of latter pulses during such coincidence, said encoder, in the presence of a modulating signal, delivering pulses which are position-modulated, latter pulses, because of their lack of synchronism with the fixed pulses from said inhibit pulse generator, no longer coinciding with the inhibit pulses and therefore passing through said gate.

11. A modulation-operated switch for use with a pulse position modulated transmitter encoder for removing energy from the transmission medium in the absence of modulation, said switch comprising a gate for controlling the flow of pulses from the encoder, an inhibit pulse generator for generating gate-controlling pulses, fixed in time, for controlling the operation of said gate, means for causing said generator to generate the gate-controlling pulses in coincidence with unmodulated pulses emanating from said encoder, said gate blocking the flow of latter pulses during such coincidence, said encoder, in the presence of a modulating signal, delivering pulses which are position-modulated, latter pulses, because of their lack of synchronism with the fixed pulses from said inhibit pulse generator, no longer coinciding with the inhibit pulses and therefore passing through said gate, and means for preventing the triggering of said inhibit pulse generator in the presence of modulation, thereby preventing the generation of inhibit pulses, so that encoder pulses which in the normal course of modulation might otherwise periodically coincide with the inhibit pulses, will not be inhibited.

12. A modulation-operated switch for use in combination with the encoder for generating keying pulses for a pulse position modulated transmitter, and a basic timing means utilized in the operation of the encoder, said switch comprising an inhibit gate for controlling the output of transmitter keying pulses from said encoder, an inhibit pulse generator for generating inhibit pulses, fixed in time, which are utilized for controlling the operation of said inhibit gate, said basic timing means controlling the rate of transmitter keying pulses supplied by said encoder to said inhibit gate, and also controlling said inhibit pulse generator so that inhibit pulses will be generated in coincidence with unmodulated pulses from said encoder, said gate passing transmitter keying pulses that contain modulation as a result of the time change of position of said pulses with respect to said inhibit pulses, said gate preventing the passage of unmodulated pulses from said encoder.

13. A modulation-operated switch for use in combination with the encoder for generating keying pulses for a pulse position modulated transmitter, and a basic timing means utilized in the operation of the encoder, said switch comprising an inhibit gate for controlling the output of transmitter keying pulses from said encoder, an inhibit pulse generator for generating inhibit pulses, fixed in time, which are utilized for controlling the operation of said inhibit gate, said basic timing means controlling the rate of transmitter keying pulses supplied by said encoder to said inhibit gate, and also controlling said inhibit pulse generator so that inhibit pulses will be generated in coincidence with unmodulated pulses from said encoder, said gate passing transmitter keying pulses that contain modulation as a result of the time change of position of said pulses with respect to said inhibit pulses, said gate preventing the passage of unmodulated pulses from said encoder, and means for disabling said inhibit pulse generator shortly after the commencement of modulation, whereby no inhibit pulses will be generated.

14. A modulation-operated switch for use in combination with the encoder used for generating keying pulses for a pulse position modulated transmitter, the keying pulses being positioned in time in accordance with the modulation signal applied to the encoder, and clock means for controlling the basic operation of the encoder, said switch comprising a diode inhibit gate for controlling the output of transmitter keying pulses from said encoder, a clock-controlled inhibit pulse generator for generating inhibit pulses, fixed in time, which are utilized for controlling the operation of said inhibit gate, said clock means controlling the rate of transmitter keying pulses supplied by said encoder to said inhibit gate, and supplying triggering signals for controlling said inhibit pulse generator so that inhibit pulses will be generated in coincidence with unmodulated pulses from said encoder, said gate passing transmitter keying pulses that contain modulation as a result of the time change of position of said pulses with respect to said inhibit pulses, said gate preventing the passage of unmodulated pulses from said encoder, rectifier means for creating a signal from the modulation signal input to said encoder, diode means disposed on the input side of said inhibit pulse generator, said diode means being capable of being biased to prevent the flow of triggering signals to said inhibit pulse generator, said rectifier, by its signal created as a result of modulation, causing said diode to be biased to prevent generation of inhibit pulses in the presence of modulation.

15. A modulation operated switch for preventing the passage of unmodulated pulses from pulse position modulation equipment, said switch comprising a gate having a plurality of inputs and an output, inhibit pulse generating means connected to one of said inputs and arranged to supply inhibit pulses to said gate that are in fixed relation to a time frame, another of said inputs receiving a stream of pulse position modulated pulses, latter pulses when carrying information being disposed in a variable relation with respect to a zero reference position, thus reflecting the degree of modulation present, the zero reference of the pulse position modulation time frame representing a priori information employed in the generation of inhibit pulses, such inhibit pulses being in time coincidence in said gate with pulses from said source that are located at such zero reference point, said gate preventing the passage of non-information bearing pulses disposed in time coincidence with such inhibit pulses, but passing pulses containing position modulated information by virtue of the time change of position of such pulses with respect to said inhibit pulse.

References Cited by the Examiner

UNITED STATES PATENTS

| | | | |
|---|---|---|---|
| 2,272,070 | 2/42 | Reeves | 325—38 |
| 2,379,899 | 7/45 | Hansell | 325—38 |
| 2,430,139 | 11/47 | Peterson | 325—38 |
| 2,531,846 | 11/50 | Goodall | 325—38 |

DAVID G. REDINBAUGH, *Primary Examiner.*